(12) United States Patent
Kwon et al.

(10) Patent No.: US 6,734,923 B2
(45) Date of Patent: May 11, 2004

(54) STEREOSCOPIC LIQUID CRYSTAL DISPLAY DEVICE USING A LIQUID CRYSTAL POLYMER FILM AND FABRICATING METHOD THEREOF

(75) Inventors: Soon-Bum Kwon, Gyeonggi-do (KR); Jin-Hee Jung, Gyeonggi-do (KR); Hyung-Gi Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/090,769

(22) Filed: Mar. 6, 2002

(65) Prior Publication Data

US 2002/0145682 A1 Oct. 10, 2002

(30) Foreign Application Priority Data

Mar. 7, 2001 (KR) ..................................... 2001-0011617

(51) Int. Cl.[7] ............................................. G02F 1/1335
(52) U.S. Cl. ......................... 349/15; 349/96; 359/462; 359/464; 359/465
(58) Field of Search ...................... 349/15, 96; 359/462, 359/464, 465, 483, 489, 502

(56) References Cited

U.S. PATENT DOCUMENTS

| 5,287,208 | A | * | 2/1994 | Shimoto et al. ............. 349/123 |
| 5,751,389 | A | * | 5/1998 | Andreatta et al. ............ 349/97 |
| 5,917,562 | A | * | 6/1999 | Woodgate et al. ............ 349/15 |
| 6,084,647 | A | * | 7/2000 | Hatano et al. ................ 349/15 |
| 6,133,980 | A | * | 10/2000 | Faris ........................... 349/176 |
| 6,243,146 | B1 | | 6/2001 | Rho et al. |
| 6,541,185 | B1 | * | 4/2003 | Matsunaga et al. ......... 430/231 |
| 2002/0059013 | A1 | | 5/2002 | Rajala et al. |

\* cited by examiner

Primary Examiner—Tarifor R. Chowdhury
Assistant Examiner—Michael H. Caley
(74) Attorney, Agent, or Firm—McKenna Long & Aldridge LLP

(57) ABSTRACT

A stereoscopic liquid crystal display device and method using a liquid crystal polymer film. Light transmitted through first and second micro-polarizing regions have different phases from each other, and light with different polarization properties is emitted.

28 Claims, 10 Drawing Sheets

STEREOSCOPIC LIQUID CRYSTAL DISPLAY DEVICE USING A LIQUID CRYSTAL POLYMER FILM AND FABRICATING METHOD THEREOF

This application claims the benefit of Korean Patent Application No. 2001-11617, filed on Mar. 7, 2001, which is hereby incorporated by reference as if fully set forth herein.

BACKGROUND OF THE INVENTION

1. Field of the Invention

The present invention relates to a liquid crystal display device, and more particularly to a stereoscopic liquid crystal display device using a liquid crystal polymer film and fabricating method thereof.

2. Discussion of the Related Art

In normal vision, human eyes perceive views of the world from two different perspectives due to their spatial separation. The spatial separation between typical eyes is about 65 mm. In order to assess the distance between objects, the brain integrates the two perspectives obtained from each eye. In order to provide a display, which is effective in displaying three-dimensional (3-D) images, it is necessary to recreate this situation to the observer. That is, supplying a so-called "stereoscopic pair" of images to the observer's eyes.

The technology expressing the 3-D images can be divided according to the display method, the viewpoint, whether or not the glasses are adopted, the structure of the system, and the condition of observation. Especially, the 3-D displays using the parallax between the right and left eyes may be classified into two types according to whether or not the glasses are adopted: stereoscopic displays and autostereoscopic displays. Stereoscopic displays have polarization type and time division type. Autostereoscopic displays have barrier type and lenticular type.

Stereoscopic displays typically display both of the images over a wide viewing area. The views are encoded by color, polarization state, and time of the display. A filter system of glasses worn by the observer separates the views; thereby each eye sees only the view that is intended for it. That is, the right and left eyes have different views.

Autostereoscopic displays present a spatial image to the viewer without the use of glasses, goggles or other viewing aids. Instead, the two views are only visible from defined regions of space. A "viewing region" is a term described as the region of space in which an image is visible across the whole display active area. If the observer is situated such that one eye is in one viewing region and the other eye is in the other viewing region, then a correct set of views is seen and a 3-D image is perceived by the observer. In autostereoscopic displays, an image splitter and a cylindrical lens array is combined in the conventional display device.

Stereoscopic displays can be divided into anaglyph type, concentration difference type, polarizing filter type and LCD shutter type. In anaglyph type, red and blue or red and green filters are used for the right and left lenses of the glasses, respectively. In concentration difference type, filters whose transmittances are different from each other are used for the right and left lenses of the glasses. In polarizing filter type, optical principle is used for the 3-D projection. In LCD shutter type, the right and left lenses of the glasses are alternatively shut and simultaneously, the images for the right and left eyes are alternatively displayed.

Especially in the stereoscopic displays of polarizing filter type, a polarizing plate is formed on the surface of the display, thereby light parallel to the transmission axes of the polarizing filters of the right and left lenses, respectively, is emitted. The transmission axis of the polarizing filter is called the polarization axis. The polarizing plate has a plurality of micro-polarizing plates whose polarization axes are parallel to the corresponding polarization axes of the polarizing filters of the right and left lenses. Since light emitted from the plurality of micro-polarizing plates are received by the right and left lenses of the glasses respectively, the 3-D images are perceived by the binocular parallax of the viewer.

FIGS. 1A and 1B are perspective views of polarizing plates attached to a stereoscopic device of a conventional polarizing filter type and FIG. 1C is a perspective view of conventional polarizing glasses.

In FIGS. 1A to 1C, polarizing plates "A" and "B" are composed of a plurality of micro-polarizing plates 32a and 32b whose polarization axes are parallel to the corresponding polarization axes 33a and 33b of the polarizing film attached to the right and left lenses of the polarizing glasses 30 in mosaic and stripe shapes, respectively. The polarizing plates "A" and "B," having a plurality of micro-polarizing plates 32a and 32b, are formed through fabrication processes of FIGS. 2A to 2F.

FIGS. 2A to 2F are schematic cross-sectional views showing fabrication processes of a conventional polymer polarizing film taken along a line II—II of FIGS. 1A and 1B.

In FIG. 2A, a plurality of first micro-polarizing regions "C" and second micro-polarizing regions "D" are defined on an entire surface of a substrate 34.

In FIG. 2B, a polymer polarizing film 36 having a first polarization axis 38a is formed on the substrate 34. Generally, the polymer polarizing film 36 is made by adsorbing iodine (I) or dichromatic dyes into one-directionally elongated poly vinyl alcohol (PVA) film. Here, a transmission axis of the polarizing film, i.e., a polarization axis is perpendicular to the elongated direction of the PVA film. In ambient light, only linearly polarized light parallel to the polarization axis of the polarizing film is transmitted.

In FIG. 2C, after forming a photoresist (PR) layer 39 on the polymer polarizing film 36, an exposure process is performed with a mask 40 over the polymer polarizing film 36. The mask 40 has a plurality of transmission regions "E" and a plurality of shield regions "F". The PR is divided into positive type and negative type. For the positive type, the PR of the exposed region is removed by the developing solution. For the negative type, the PR is not removed. In this description, the case using the PR of the positive type is explained. That is, the mask 40 is disposed over the substrate 34 so that the plurality of shield regions "F" corresponds to the plurality of first micro-polarizing regions "C".

In FIG. 2D, after developing, a PR pattern 39a is formed only at the plurality of first micro-polarizing regions "C".

In FIG. 2E, the polymer polarizing film of the plurality of the second micro-polarizing regions "D" is etched by, for example, a chemical etching method (water:ethyl alcohol= 30%:70%), photochemical etching method, excimer laser etching method or reactive ion etching method. Then, the PR pattern 39a on the plurality of first micro-polarizing regions "C" is removed by the stripper. Through this photolithography process, a first polarizing film 43 having a plurality of first micro-polarizing plates 42a at the plurality of first micro-polarizing regions "C" is formed.

In FIG. 2F, a second polarizing film 45 having a plurality of second micro-polarizing plates 42b at the plurality of second micro-polarizing regions "D" is formed on another substrate 40 by repetition of processes of FIGS. 2A to 2E. The polarization axis 38b of the second polarizing film 45 is perpendicular to the polarization axis 38a of the first polarizing film 43 on the plane parallel to the substrate.

In FIG. 2G, a polymer polarizing film 47 having the plurality of first and second micro-polarizing plates 42a and 42b whose polarizing axes 38a and 38b are perpendicular to each other is formed by attaching the first and second polarizing films 43 and 45.

The polymer polarizing film 47 can be fabricated by other methods, and one example of a fabrication method will be explained as follows.

FIGS. 3A to 3E are schematic cross-sectional views showing other fabrication processes of a conventional polymer polarizing film.

In FIG. 3A, through exposure and developing processes, a PR pattern 39a is formed on a PVA film 36 at a plurality of first micro-polarizing regions "C" as in FIG. 2D.

In FIG. 3B, the polymer polarizing film 36 of exposed region 37 between the PR pattern 39a is bleached. That is, to eliminate the polarization property of exposed region 37 of the polymer polarizing film 36, the exposed surface of the polymer polarizing film 36 is treated by a caustic solution such as potassium hydroxide. The caustic solution, i.e., the bleaching solution can eliminate the dichromatic effect of the PVA film so that light is not polarized at the bleached region.

In FIG. 3C, after removing the PR pattern 39a by the etchant, a first polarizing film 48 composed of a plurality of first micro-polarizing plates 42 having a first polarization axis 38a and a plurality of first bleached regions 37 is formed.

In FIG. 3D, by depositing the PVA film on another substrate 46 and repeating the processes of FIGS. 3A to 3C, a second polarizing film 54 composed of a plurality of second micro-polarizing plates 50 having a second polarization axis 38b and a plurality of second bleached regions 52 is formed. The second polarization axis 38b of the plurality of second micro-polarizing plates 50 is perpendicular to the first polarization axis 38a (of FIG. 3C) of the plurality of first micro-polarizing plates 42 (of FIG. 3C). Furthermore, the plurality of second micro-polarizing plates 50 and the plurality of second bleached regions 52 are disposed at the second polarizing region "D" and the first polarizing region "C," respectively.

In FIG. 3E, the first and second polarizing films 48 and 54 are attached to obtain the polymer polarizing film 56. Since the first micro-polarizing plate 42 of the first polarizing film 48 corresponds to the second bleached region 52 of the second polarizing film 48, the attached polymer polarizing film 56 is composed of the plurality of first and second micro-polarizing plates 42 and 50 whose polarization axes are perpendicular to each other. Each micro-polarizing plate 42 and 50 can be formed in a mosaic or stripe shape.

However, the fabricating method of a polarizing plate using a polymer polarizing film such as PVA includes the process of forming individual polarizing films corresponding to right and left lenses of glasses and the process of attaching individual polarizing films. Therefore, the fabricating process of the polarizing plate is too complicated and the production yields are decreased due to the increased cost.

SUMMARY OF THE INVENTION

Accordingly, the present invention is directed to a stereoscopic liquid crystal display device that substantially obviates one or more of problems due to limitations and disadvantages of the related art.

An advantage of the present invention is to provide a stereoscopic liquid crystal display device that uses a liquid crystal polymer film instead of a conventional polymer polarizing film, and fabricating method thereof.

Another advantage of the present invention is to simplify the fabricating process and to improve the production yields due to the reduced cost.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a stereoscopic liquid crystal display device includes: first and second substrates facing and spaced apart from each other; a liquid crystal polymer film having first and second micro-polarizing regions on an inner surface of the first substrate, polarization axes of the first and second micro-polarizing regions being different from each other; a first polarizing plate on the liquid crystal polymer film; a common electrode on the first polarizing plate; a second polarizing plate on an outer surface of the second substrate; a switching device on an inner surface of the second substrate; a pixel electrode connected to the switching device; and a liquid crystal layer interposed between the common electrode and the pixel electrode.

In another aspect, a fabricating method of a stereoscopic liquid crystal display device includes: preparing first and second substrates, the first substrate having first and second surfaces, and the second substrate having third and fourth surfaces; forming a liquid crystal polymer film on the second surface of the first substrate; exposing a first micro-polarizing region of the liquid crystal polymer film to light with a first exposure condition, thereby the first micro-polarizing region having a first polarization axis; exposing a second micro-polarizing region of the liquid crystal polymer film to light with a second exposure condition, thereby the second micro-polarizing region having a second polarization axis; forming a first polarizing plate on the liquid crystal polymer film; forming a common electrode on the first polarizing plate; providing a second polarizing plate on the fourth surface of the second substrate; forming a switching device on the third surface of the second substrate; forming a pixel electrode connected to the switching device; attaching the first and second substrates, the second surface of the first substrate and the third surface of the second substrate facing and spaced apart from each other; and forming a liquid crystal layer interposed between the common electrode and the pixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, similar reference numbers will be used throughout the drawings to refer to the same or like parts.

Figure 1A:
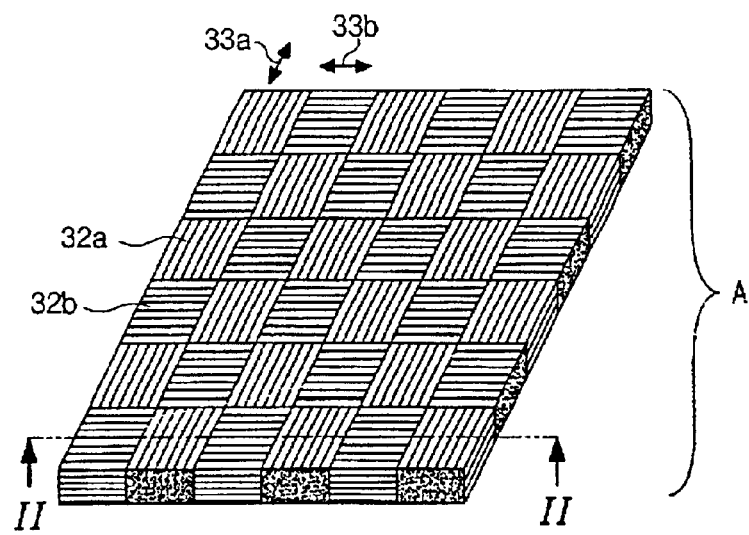
FIGS. 1A and 1B are perspective views of polarizing plates attached to a stereoscopic device of a conventional polarizing filter type.
Figure 1B:
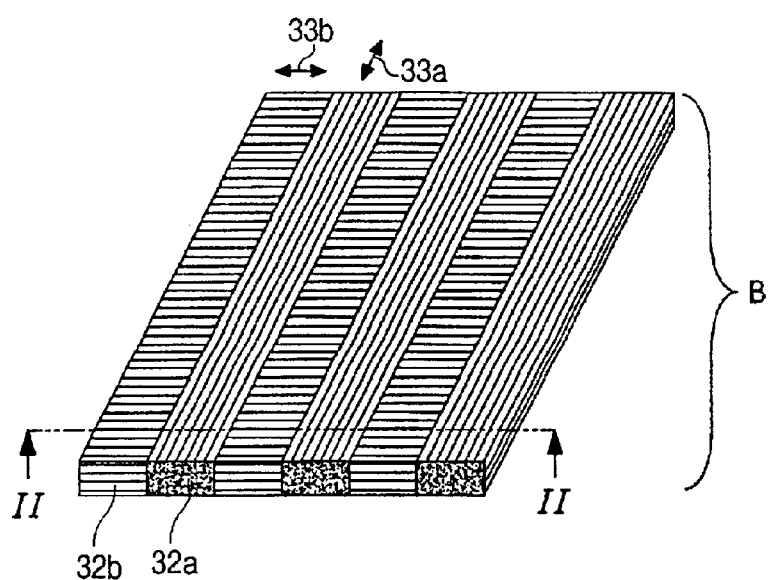
Figure 1C:
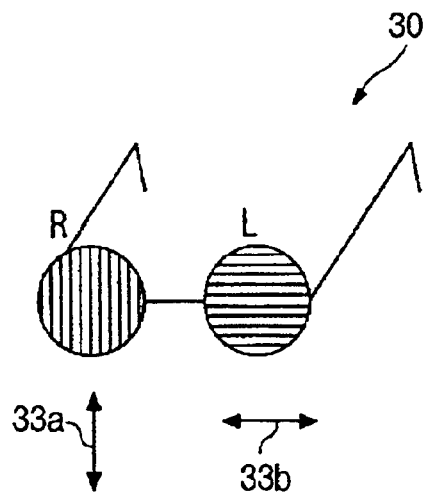
FIG. 1C is a schematic perspective view of conventional polarizing glasses.
Figure 2A:
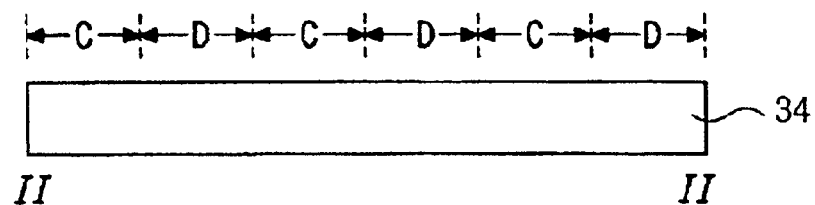
FIGS. 2A to 2G are schematic cross-sectional views showing fabrication processes of a conventional polymer polarizing film taken along a line II—II of FIGS. 1A and 1B.
Figure 2B:
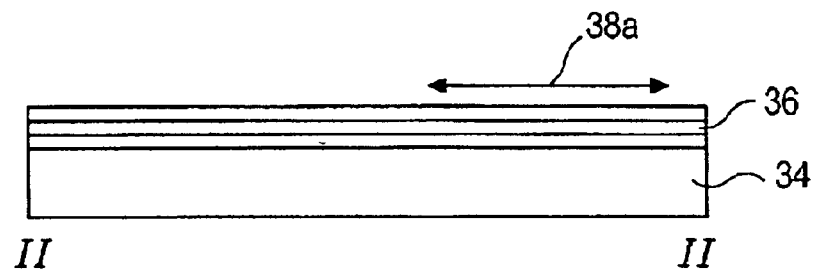
Figure 2C:
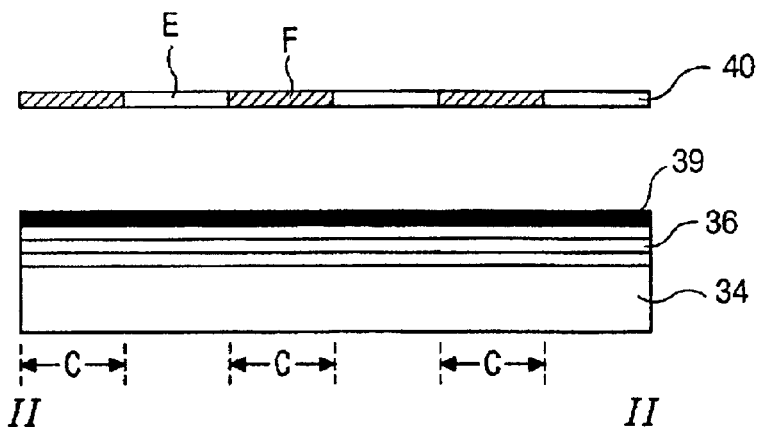
Figure 2D:
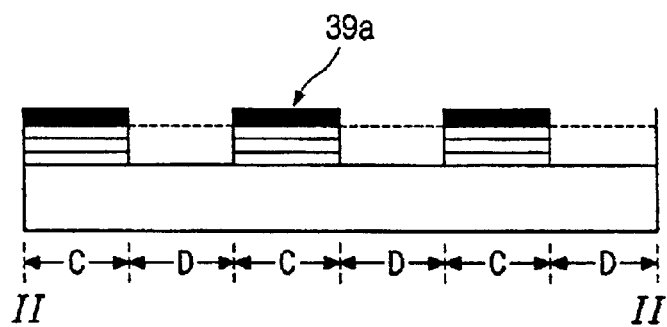
Figure 2E:
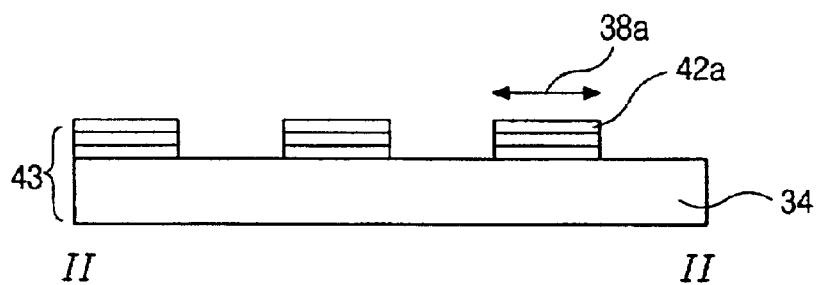
Figure 2F:
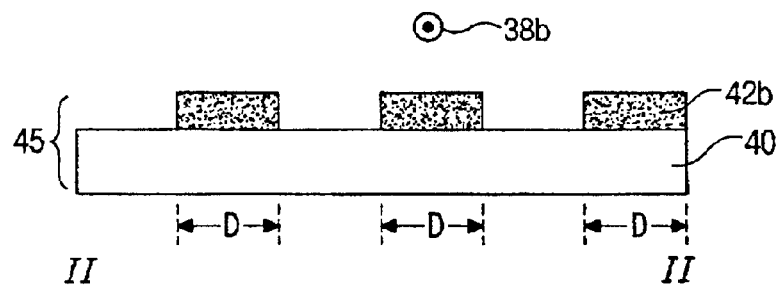
Figure 2G:
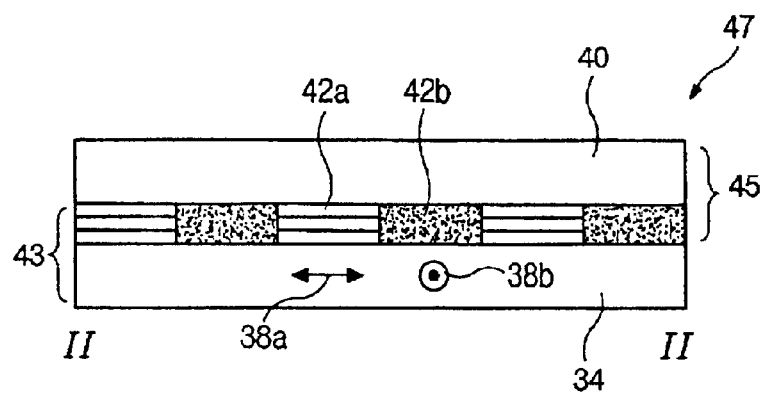
Figure 3A:
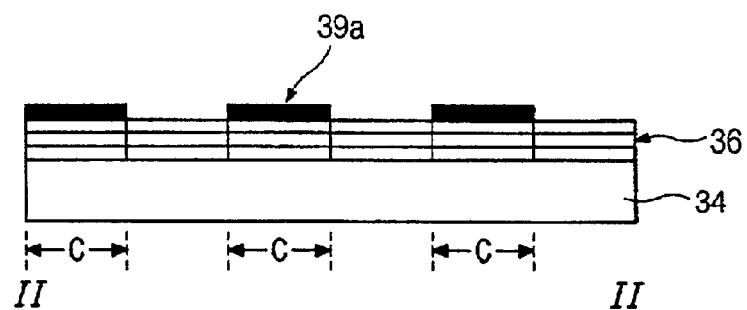
FIGS. 3A to 3E are schematic cross-sectional views showing another fabrication processes of a conventional polymer polarizing film.
Figure 3B:
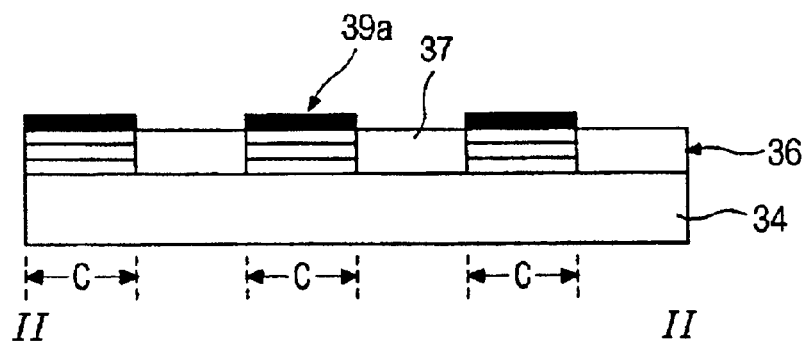
Figure 3C:
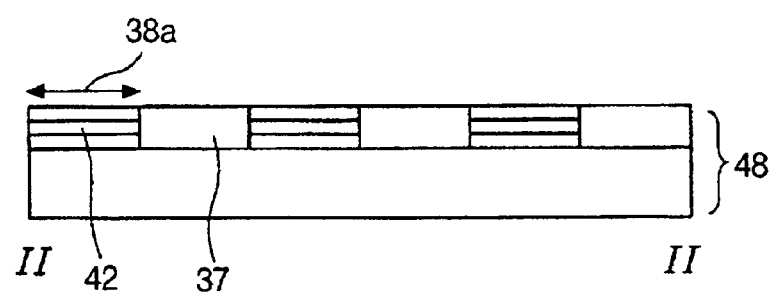
Figure 3D:
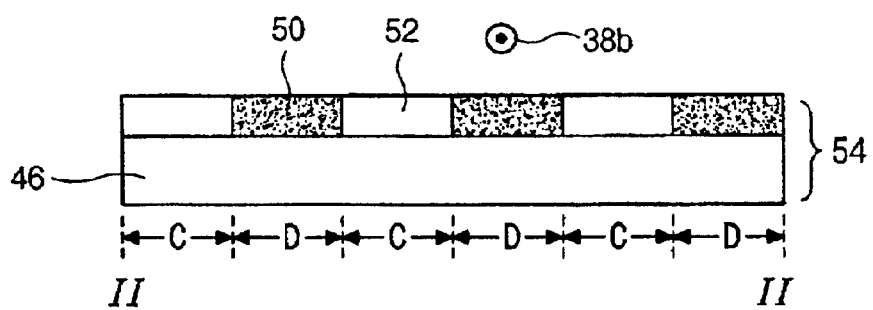
Figure 3E:
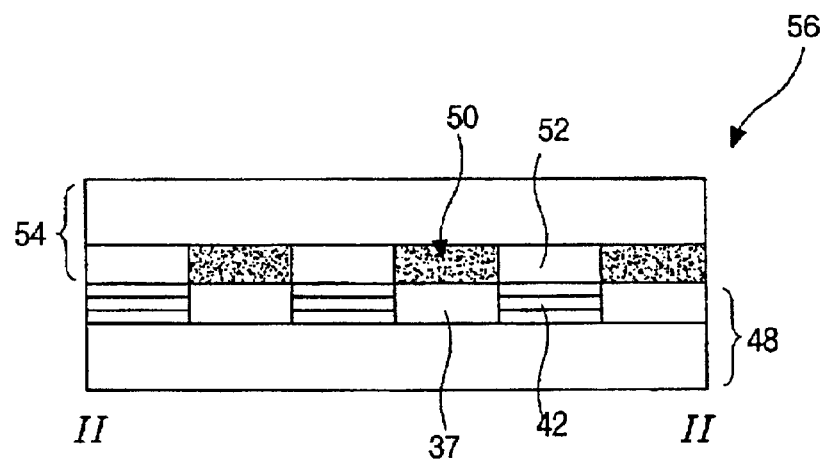
Figure 4:
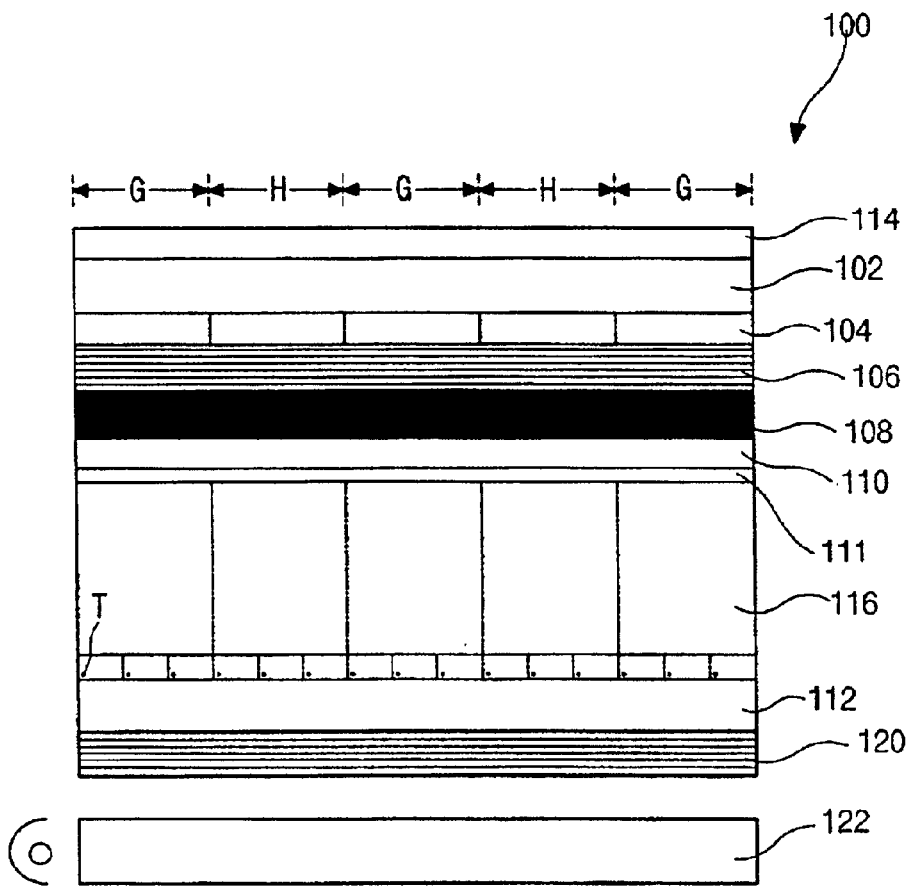
FIG. 4 is a schematic cross-sectional view of a stereoscopic liquid crystal display device according to an embodiment of the present invention.

FIG. 4 is a schematic cross-sectional view of a stereoscopic liquid crystal display device according to an embodiment of the present invention.

In FIG. 4, first and second substrates 102 and 112 are facing and spaced apart from each other. A liquid crystal polymer film 104, a first polarizing plate 106, a color filter layer 108, an overcoat layer 110 and a common electrode 111 are subsequently formed on an inner surface of the first substrate 102. A switching device "T" is formed on an inner surface of the second substrate 112 and a pixel electrode (not shown) is connected to the switching device "T". A liquid crystal layer 116 is interposed between the common electrode 111 and the pixel electrode. On an outer surface of the first substrate 102, an anti-glare film 114 can be formed to prevent surface glare of the liquid crystal display device. Furthermore, a second polarizing plate 120 is formed on an outer surface of the second substrate 112 and a backlight is provided over the second polarizing plate 120.

In the stereoscopic liquid crystal display device having the above-mentioned structure, first and second micro-polarizing regions "G" and "H" are defined. Since light transmitted through the first and second micro-polarizing regions "G" and "H" have different phases from each other, light with different polarization properties is emitted. These characteristics result from the liquid crystal polymer film.

The liquid crystal polymer film 104 is a compounded polymer material in which a chiral dopant having helical twisting power is added with a small quantity to a polymer solvent. Therefore, the polymer solution includes a chiral dopant having a twisting property so that the liquid crystal polymer film has the twisting property. The twisting angle can be adjusted by the concentration of the chiral dopant and the photochemical property of the liquid crystal polymer film. For example, if a liquid crystal polymer film whose twist angle is 90° is exposed to light of a specific intensity, the twist angle becomes less than 90°. The photochemical property of the liquid crystal polymer film is disclosed in detail in the paper (App. Phys., Vol. 85, No. 11, Jun. 1, 1999). If the twist angles of the liquid crystal polymer film are different from each other due to the photochemical property, the phase differences of the transmitted light are also different from each other. Therefore, the liquid crystal polymer films disposed at the first and second micro-polarizing regions "G" and "H" can be made to have different pitches so that the polarization properties can be different. Consequently, the liquid crystal polymer film can be defined by a plurality of micro-polarizing regions having different polarization properties.

FIGS. 5A to 5E are a schematic cross-sectional views showing fabrication processes of a first substrate for a stereoscopic liquid crystal display device according to an embodiment of the present invention.

Figure 5A:
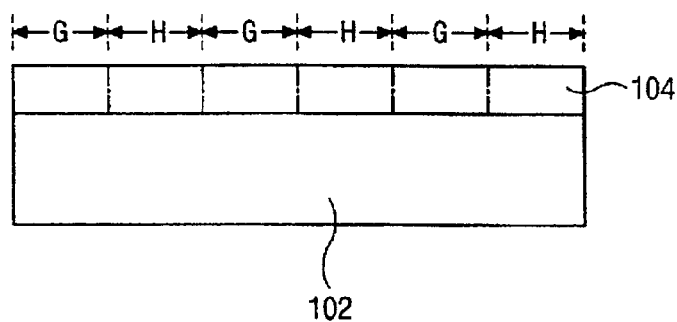
FIGS. 5A to 5E are schematic cross-sectional views showing fabrication processes of a first substrate for a stereoscopic liquid crystal display device according to an embodiment of the present invention.

In FIG. 5A, a liquid crystal polymer film 104 is formed on a first substrate 102. A polymer solution is deposited on the first substrate 102, on which a rubbed alignment layer (not shown) is formed, by a spin coating method or a roller coating method to form the liquid crystal polymer film 104. The liquid crystal polymer film 104 is defined by a first micro-polarizing region "G" having a first polarization property and a second micro-polarizing region "H" having a second polarization property. A width of the micro-polarizing region can be determined according to the resolution, usually within a range of several tens to several hundreds micrometers.

Figure 5B:
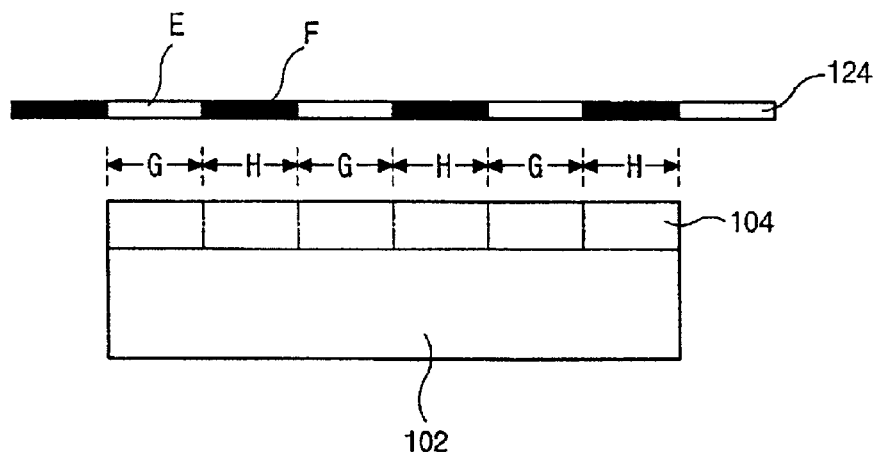

In FIG. 5B, a mask 124 having a transmission region "E" and a shield region "F" is disposed over the liquid crystal polymer film 104. Then, the twist angle of the liquid crystal molecule of the first micro-polarizing region "G" can be adjusted by exposing the liquid crystal polymer film 104 to light with a first exposure condition such as time or intensity.

Figure 5C:
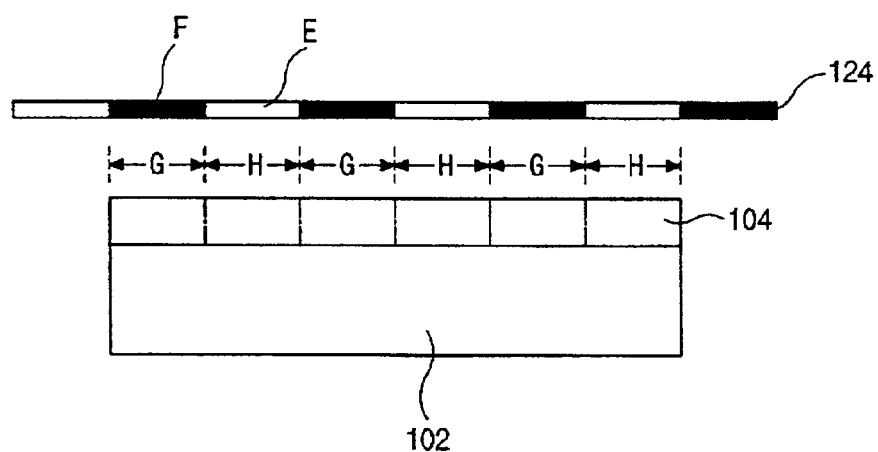

In FIG. 5C, the mask 124 is disposed over the liquid crystal polymer film 104, in which the transmission region "E" of the mask 124 corresponds to the second micro-polarizing region "H," so that the twist angle of the second micro-polarizing region "H" can be adjusted by exposing the liquid crystal polymer film 104 to light with a second exposure condition such as time or intensity.

Figure 5D:
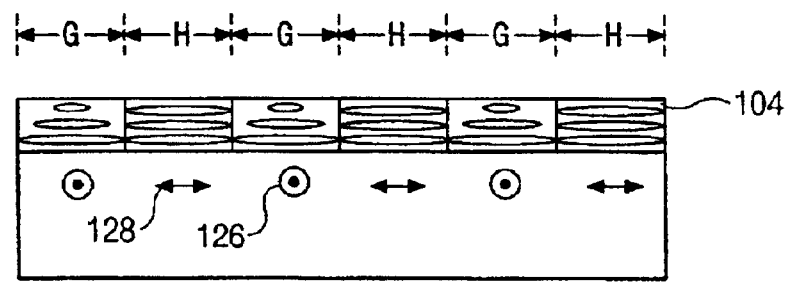

Therefore, in FIG. 5D, the polarization axis 126 of light having passed through the liquid crystal polymer film 104 corresponding to the first micro-polarizing region "G" can be made perpendicular to the polarization axis 128 of light having passed through the liquid crystal polymer film 104 corresponding to the second micro-polarizing region "H".

Figure 5E:
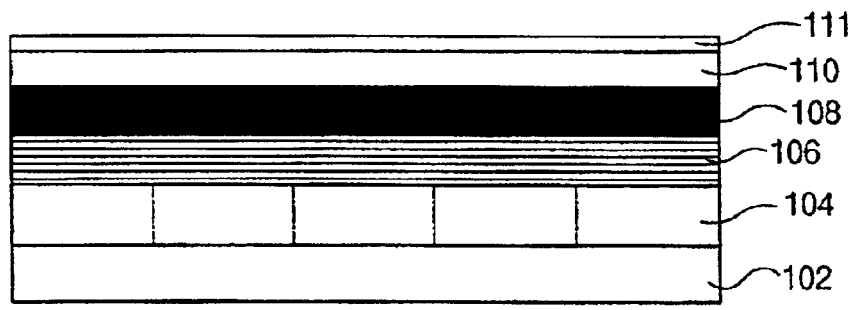

In FIG. 5E, a linear polarizing plate 106 made of a polymer such as PVA is formed on the liquid crystal polymer film 104. Subsequently, a color filter layer 108, an overcoat layer 110 made of one of the organic insulating material group of benzocyclobutene (BCB) and acrylic resin, and a transparent common electrode 111 made of one of the transparent conductive metal group of indium-tin-oxide (ITO) and indium-zinc-oxide (IZO) are formed on the linear polarizing plate 106.

Figure 6:
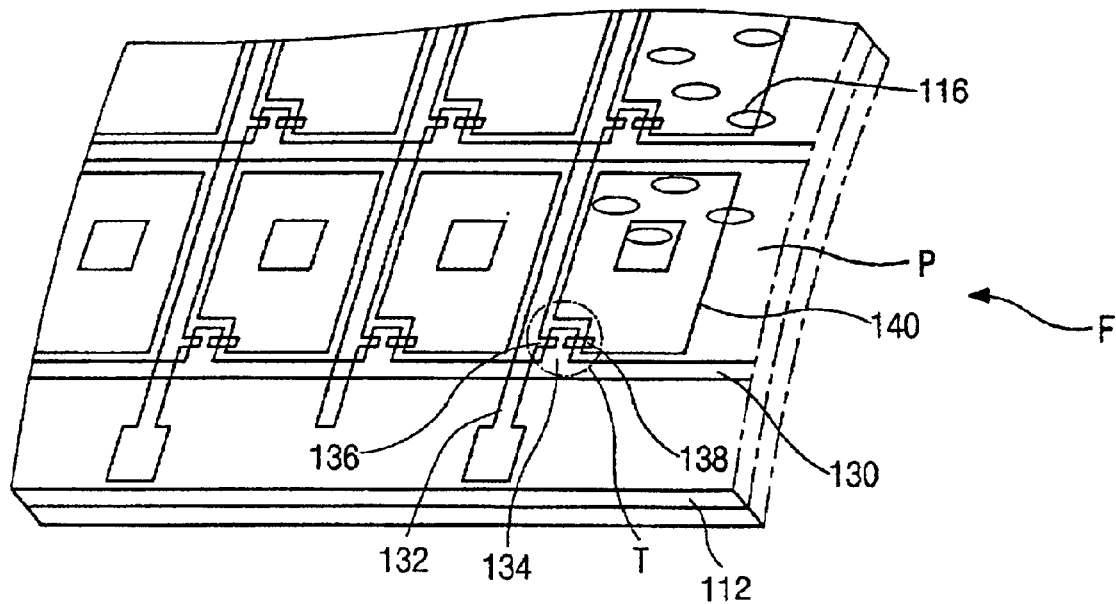
FIG. 6 is a schematic perspective view of a second substrate according to an embodiment of the present invention.

FIG. 6 is a schematic perspective view of a second substrate according to an embodiment of the present invention.

In FIG. 6, a gate line 130 applying a scan signal, a data line 132 defining a pixel region "P" with the gate line 130, and a thin film transistor (TFT) "T" adjacent to the crossing of the gate and data lines 130 and 132 are formed on a second substrate "F," i.e., an array substrate. The TFT "T" has a gate electrode 134, a source electrode 136 and a drain electrode 138. The scan signal is applied to the gate electrode 134 from the gate line 130 and the data signal is applied to the source electrode 136 from the data line 132. The source and drain electrodes 136 and 138 are spaced apart from each other. Furthermore, an active layer (not shown) of a semiconductor is formed over the gate electrode 134. In the pixel region "P," a transparent pixel electrode 140 is formed and the data signal is applied to the pixel electrode 140 from the drain electrode 138 so that a liquid crystal layer 116 can be driven by the pixel electrode 140 and the common electrode 111 (of FIG. 5E). Then, the first and second substrates are attached to form a stereoscopic liquid crystal display device.

Figure 7A:
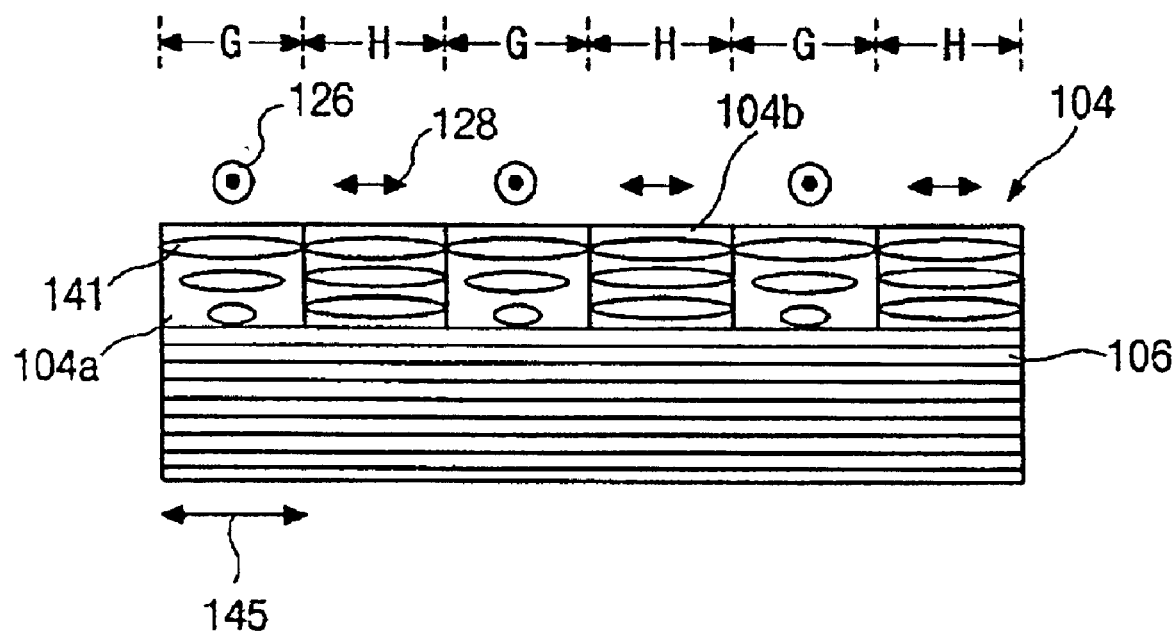
FIG. 7A is a schematic cross-sectional view of a liquid crystal polymer film and a first polarizing plate according to an embodiment of the present invention.
Figure 7B:
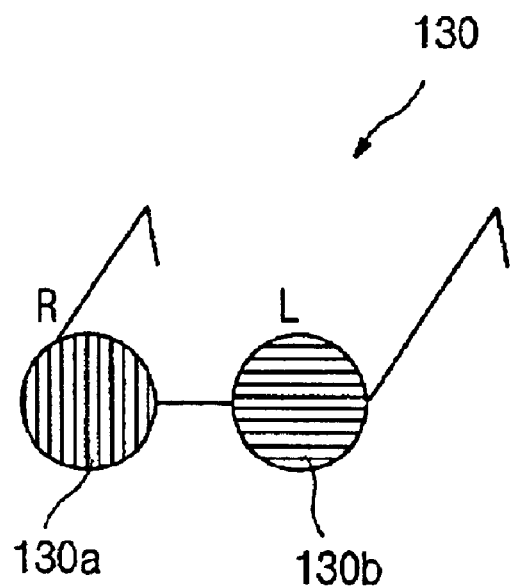
FIG. 7B is a schematic perspective view of polarizing glasses.

FIG. 7A is a schematic cross-sectional view of a liquid crystal polymer film and a first polarizing plate according to an embodiment of the present invention and FIG. 7B is a schematic perspective view of a polarizing glasses. For example, a liquid crystal molecule of a liquid crystal polymer film 104 corresponding to the first micro-polarizing region "G" has a twist angle of 90° and a liquid crystal molecule of a liquid crystal polymer film 104 corresponding to the second micro-polarizing region "H" has a homogeneous alignment.

In FIG. 7A, the liquid crystal polymer film 104a corresponding to the first micro-polarizing region "G" is formed such that the long axes of liquid crystal molecules 141 adjacent to the top and bottom of the liquid crystal polymer film 104a are perpendicular to each other in a plane. Therefore, light emitted from a linearly polarizing plate 106, parallel to the transmission axis 145, is rotated for transmitting the first micro-polarizing region "G" of the liquid crystal polymer film 104 so that the polarization axis 125 of the transmitted light has an angle of 90° with the transmission axis 145. On the other hand, light transmitted through the liquid crystal polymer film 104b corresponding to the second micro-polarizing region "H" does not have a phase difference so that the polarization axis 128 is parallel to the transmission axis 145 of the linearly polarizing plate 106.

In FIG. 7B, light transmitted through the first and second micro-polarizing regions "G" and "H" of the liquid crystal polymer film 104, perpendicular to each other, reach the right and left eyes of the viewer through the right and left lenses 130a and 130b of the polarizing glasses 140, respectively.

Figure 8:
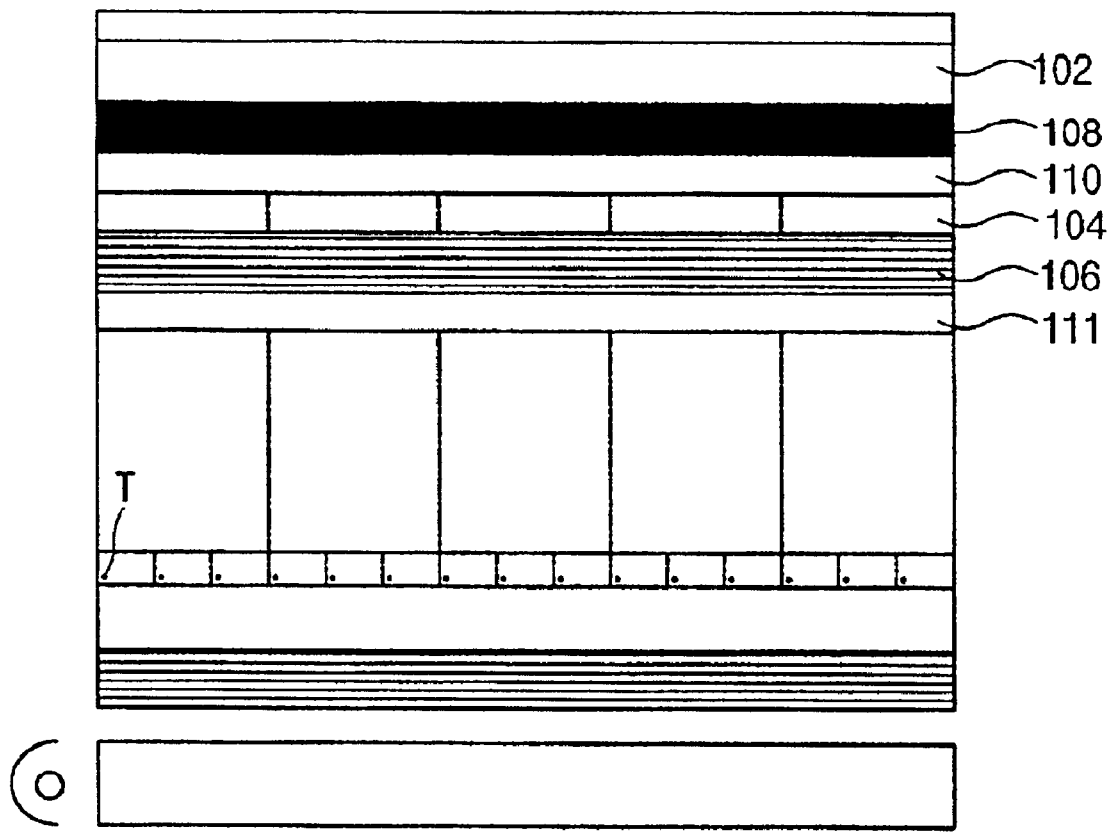
FIG. 8 is a schematic cross-sectional view of a stereoscopic liquid crystal display device according to another embodiment of the present invention.

FIG. 8 is a schematic cross-sectional view of a stereoscopic liquid crystal display device according to another embodiment of the present invention.

In FIG. 8, after a color filter layer 108 is formed on an inner surface of a first substrate 102, an overcoat layer 110 is formed on the color filter layer 108. If the color filter layer 108 is planarized, the overcoat layer 110 can be omitted. Subsequently, a liquid crystal polymer film 104 having a micro-polarizing region, a linearly polarizing plate 106 and a transparent common electrode 111 are formed on the overcoat layer 110. An orientation film can be interposed between the overcoat layer and the liquid crystal polymer film.

Consequently, since the stereoscopic liquid crystal display device can have locally different polarization, properties due to the combination of the linearly polarizing plate and the liquid crystal polymer film having different micro-polarizing regions according to the amount of exposed light, the fabricating process can be simplified and the cost can be reduced.

It will be apparent to those skilled in the art that various modifications and variation can be made in the method of manufacturing a stereoscopic liquid crystal display device of the present invention without departing from the spirit or scope of the invention. Thus, it is intended that the present invention cover the modifications and variations of this invention provided they come within the scope of the appended claims and their equivalents.

What is claimed is:

1. A stereoscopic liquid crystal display device, comprising:
   first and second substrates facing and spaced apart from each other;
   a liquid crystal polymer film having first and second micro-polarizing regions on an inner surface of the first substrate, the first micro-polarizing region having a first twist angle and the second micro-polarizing region having a second twist angle, wherein the liquid crystal polymer includes a chiral dopant, and the first twist angle is different from the second twist angle;
   a first polarizing plate on the liquid crystal polymer film;
   a common electrode on the first polarizing plate;
   a second polarizing plate on an outer surface of the second substrate;
   a switching device on an inner surface of the second substrate;
   a pixel electrode connected to the switching device; and
   a liquid crystal layer interposed between the common electrode and the pixel electrode.

2. The device according to claim 1, wherein the first twist angle is about zero.

3. The device according to claim 1, further comprising a color filter layer between the first substrate and the liquid crystal polymer film.

4. The device according to claim 1, further comprising a color filter layer between the first polarizing plate and the common electrode.

5. The device according to claim 4, further comprising an overcoat layer between the color filter layer and the common electrode.

6. The device according to claim 5, wherein the overcoat layer is made of one of benzocyclobutene and acrylic resin.

7. The device according to claim 1, wherein the switching device is a thin film transistor having a gate electrode, source and drain electrodes, and an active layer.

8. The device according to claim 1, further comprising an anti-glare film formed on an outer surface of the first substrate.

9. The device according to claim 1, wherein the liquid crystal polymer film is formed by one of a spin coating method and a roller coating method.

10. The device according to claim 1, wherein the first polarizing plate is made of a polymer.

11. The device according to claim 10, wherein the polymer is poly vinyl alcohol.

12. The device according to claim 1, wherein the common electrode is made of one of indium-tin-oxide and indium-zinc-oxide.

13. The device according to claim 1, wherein a polarization axis of light having passed through the first micro-polarizing region is perpendicular to a polarization axis of light having passed through the second micro-polarizing region.

14. A fabricating method of a stereoscopic liquid crystal display device, comprising:

preparing first and second substrates, the first substrate having first and second surfaces, and the second substrate having third and fourth surfaces;

forming a liquid crystal polymer film on the second surface of the first substrate, wherein the liquid crystal polymer includes a chiral dopant;

exposing a first micro-polarizing region of the liquid crystal polymer film to light with a first exposure condition, thereby the first micro-polarizing region having a first twist angle;

exposing a second micro-polarizing region of the liquid crystal polymer film to light with a second exposure condition, thereby the second micro-polarizing region having a second twist angle, wherein the second twist angle is different from the first twist angle;

forming a first polarizing plate on the liquid crystal polymer film;

forming a common electrode on the first polarizing plate;

providing a second polarizing plate on the fourth surface of the second substrate;

forming a switching device on the third surface of the second substrate;

forming a pixel electrode connected to the switching device;

attaching the first and second substrates, the second surface of the first substrate and the third surface of the second substrate facing and spaced apart from each other; and forming a liquid crystal layer interposed between the common electrode and the pixel electrode.

15. The method according to claim 14, wherein the first twist angle is about zero.

16. The method according to claim 14, wherein the concentration of the chiral dopant and the exposing conditions control the first and second twist angles.

17. The method according to claim 14, further comprising forming a color filter layer between the second surface and the liquid crystal polymer film.

18. The method according to claim 17, further comprising forming an overcoat layer between the color filter layer and the liquid crystal polymer film.

19. The method according to claim 17, further comprising forming an overcoat layer between the first polarizing plate and the common electrode.

20. The method according to claim 19, wherein the overcoat layer is made of one of benzocyclobutene and acrylic resin.

21. The method according to claim 14, further comprising forming a color filter layer between the first polarizing plate and the common electrode.

22. The method according to claim 21, further comprising forming an overcoat layer between the color filter layer and the common electrode.

23. The method according to claim 14, wherein the switching device is a thin film transistor having a gate electrode, source and drain electrodes, and an active layer.

24. The method according to claim 14, further comprising forming an anti-glare film on an outer surface of the first substrate.

25. The method according to claim 14, wherein the liquid crystal polymer film is formed by one of a spin coating method and a roller coating method.

26. The method according to claim 14, wherein the first polarizing plate is made of a polymer.

27. The method according to claim 26, wherein the polymer is poly vinyl alcohol.

28. The method according to claim 14, wherein the common electrode is made of one of indium-tin-oxide and indium-zinc-oxide.

* * * * *